United States Patent [19]

Amberg

[11] 4,257,532

[45] Mar. 24, 1981

[54] ROTARY CLOSURE DISPENSER

[75] Inventor: Christopher P. Amberg, Toledo, Ohio

[73] Assignee: Owens-Illinois, Inc., Toledo, Ohio

[21] Appl. No.: 66,910

[22] Filed: Aug. 16, 1979

[51] Int. Cl.[3] .............................................. B65H 3/26

[52] U.S. Cl. .................................... 221/240; 133/5 R

[58] Field of Search ............... 221/236, 225, 237, 262, 221/277, 270, 224, 240; 133/5 R, 5 A, 4 R

[56] References Cited

U.S. PATENT DOCUMENTS

| | | | |
|---|---|---|---|
| 2,691,379 | 10/1954 | Foushee | 133/5 R |
| 3,191,609 | 6/1965 | Gauselmann et al. | 133/5 R |

FOREIGN PATENT DOCUMENTS

| | | | |
|---|---|---|---|
| 1579048 | 8/1969 | France | 221/270 |

*Primary Examiner*—Stanley H. Tollberg
*Attorney, Agent, or Firm*—David R. Birchall; Myron E. Click; David H. Wilson

[57] ABSTRACT

A closure dispensing apparatus for dispensing closures one at a time from a stacked array. A crank mechanism pivoted at its center for rotation with a plurality of handles in radial alignment with the pivot point. The crank mechanism is positioned beneath the stack of closures so that movable lugs which are attached to each handle can one at a time interact with the rim of the bottommost closure in the stack and pull it from the apparatus. An inclined plane arrangement is used to cause each lug in its proper sequence to move into and out of a closure rim engaging position.

8 Claims, 3 Drawing Figures

ROTARY CLOSURE DISPENSER

BACKGROUND OF THE INVENTION

Closures also known as caps and lids are used with a wide variety of containers. The closures vary greatly with respect to geometry and the materials of which they are manufactured. One well known closure is used as a temporary cover for beverage containers associated with the fast food industry. The beverages, either hot or cold, are dispensed into a paper or plastic cup and then transported for a short distance before the beverage is consumed. The closures used with hand held beverages are generally thermoformed of relatively thin flexible plastic material, such as for example, polystyrene or polyethylene.

Since the beverage containers are fragile in nature, they cannot withstand direct axial loading of any great magnitude. Consequently, the closure structure, including the lip thereof, is quite flexible, thus facilitating installation of the closure over and around the container bead. The closures have incorporated into the peripheral lip a locking mechanism that snaps into engagement with the container rim.

The closures manufactured for hot and cold beverage cups are extremely light in weight and have a tendency to stick together when stacked. To prevent the nested closures from sticking together when assembled in a stack, the top of the closure is modified from its generally planar configuration and includes indentations strategically positioned to prevent tight nesting. In many instances the denesting features are so pronounced so as to permit one closure to slide freely over the top of another without any interference from the downwardly protruding rim.

Thus it becomes apparent that if the closures are designed so that they do not nest, there will be little if any lateral stability when the closures are stacked one upon another. Various racks have been designed to accommodate and make available closures in areas where soft drinks, coffee and other beverages are sold. The existing racks necessitate removal of the closures by grasping the closure with the fingers. Invariably more than one closure is touched in the process of removing the desired closure.

DESCRIPTION OF THE PRIOR ART

The prior art has shown dispensing devices such as that described in U.S. Pat. No. 1,723,232. This particular dispensing device employs a pull slide that facilitates in the ejection of a flat folded paper cup. The handling of flat envelope-like paper cups is markedly different than handling plastic closures. The flat paper cup provides a generally planar surface upon which the next most immediate adjacent paper cup can slide. Whereas with closures that contain not only a downwardly protruding rim but also protruding antinesting features, the desirable planar sliding surface is not as well defined as in the prior art paper cup. The present invention provides a more positive ejection means than that shown and described in the prior art.

SUMMARY OF THE INVENTION

This invention relates to a closure dispensing device. More particularly, the invention relates to a device for dispensing very lightweight closures manufactured of paper or preferably plastic material. The closure dispensing device accommodates a vertically aligned stack of closures within a tubular structure that has an aperture at the bottom for the removal of one closure at a time. The closures are generally thermoformed and, consequently, are quite thin and susceptible to breakage since they are designed only as a temporary dust or splash preventing cover. The cover is forced over the bead of the container, remains in position for a short interval, is removed and discarded at or subsequent to the consuming of the beverage held within the container to which the closure has been attached. The apparatus involves a rotary dispensing wheel with a plurality of arms each containing a camming mechanism that can be actuated to engage the rim of a closure and disengage the closure from the bottom of a stack of closures. The device not only provides a storage facility for a stack of closures, but it also provides a system for dispensing closures so that the interior side of the closure need not be touched during the act of applying it to the top of a container.

DETAILED DESCRIPTION OF THE INVENTION

Figure 1:
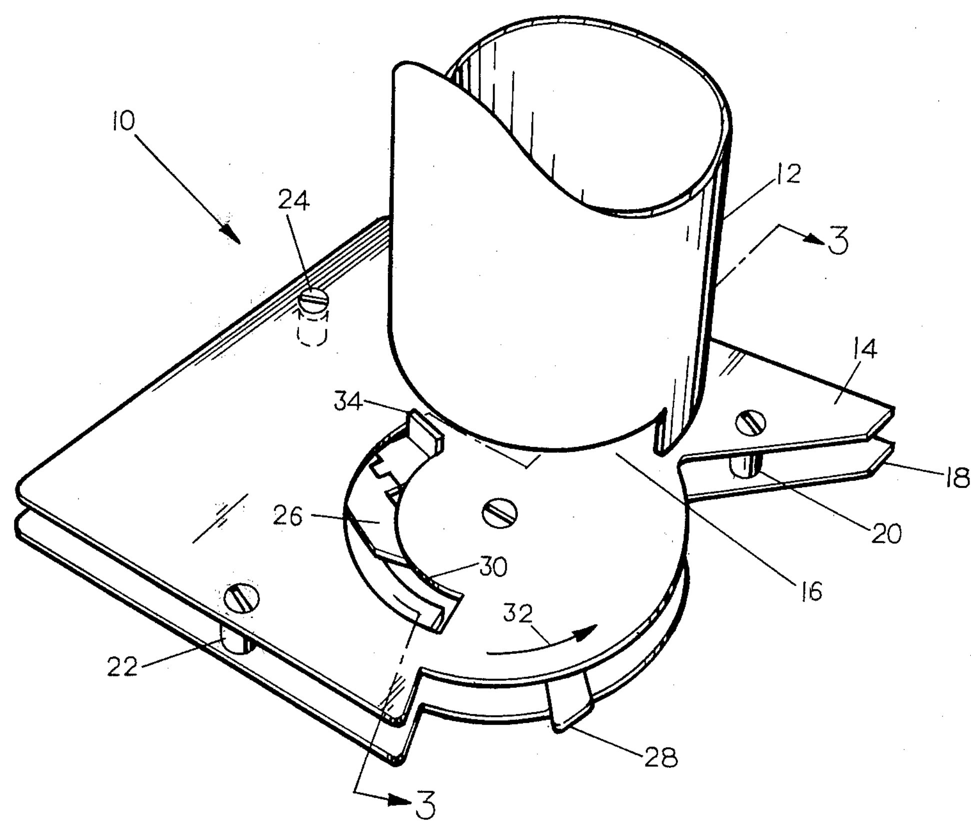
FIG. 1 is a perspective view of the apparatus with the closure storage tube being shown part in section.

The overall device or apparatus is shown in FIG. 1 and is generally represented by the numeral 10. The closures that are to be dispensed by the present invention are generally shipped in stacks where the closures are placed one on top of the other. This arrangement of stacking the closures lends itself to the closure dispenser provided by the present invention. FIG. 1 depicts a cylindrical closure housing 12 of sufficient internal diameter to accommodate the closures without the closures becoming lodged therein. The closure housing or barrel, which is shown part in section, can be of any reasonable height to handle from 10 to 100 closures. A cover (not shown) can be provided to fit over the top of closure housing 12, however, the cover is not essential to the present invention. The closure bottom housing 12 is attached to a top mounting plate 14 by any conventional means such as welding. The closure housing 12 contains a circumferentially extending cutaway closure exit slot 16 positioned at its juncture with top mounting plate 14.

Thus as it can be observed in FIG. 1, the bottom of closure housing 12 is attached to top mounting plate 14 no more than half its circumferential distance.

A bottom mounting plate 18 of configuration similar to top mounting plate 14 is positioned parallel to and in spaced apart relationship to top mounting plate 14. The spacing between the top and bottom plates 14 and 18 is maintained by at least three spacers 20, 22 and 24. A crank mechanism 26 is positioned between top and bottom plates 14 and 18. A portion of crank mechanism 26 can be seen in FIG. 1, also one of the handles 28 can be seen in FIG. 1. The top mounting plate 14 contains an arcuately shaped window 30 through which upturned lug 34 operates.

When a closure is desired, the operator need only rotate handle 28 in the direction of arrow 32 and lug 34, the end of which is visible in FIG. 1, will traverse the arcuate extent of window 30 and withdraw a closure from closure housing 12 by way of closure exit slot 16. Once the closure has been withdrawn from closure housing 12 by lug 34, the closure can be moved horizontally across the planar surface of top mounting plate 14 and positioned on top of a container that is held nearby. The lug 34 drops out of engagement with the closure it has extracted from closure housing 12, therefore, it does not impede the sliding of the closure across the surface of top mounting plate 14.

Figure 2:
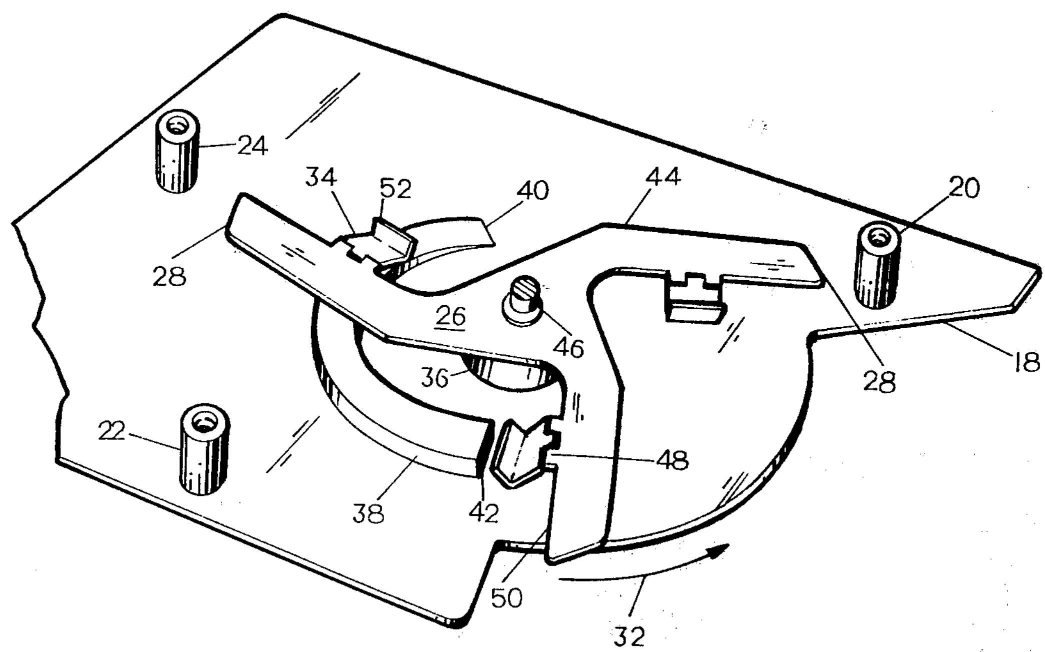
FIG. 2 is an enlarged perspective view that shows the rotary ejection mechanism.

FIG. 2 is a perspective view of overall apparatus 10 with the closure housing 12 and the top mounting plate 14 removed for a better understanding of the mechanical action of crank mechanism 26. A crank support boss 36 is positioned and preferably attached to the central region of bottom mounting plate 18. An arcuate shaped cam 38 is placed in concentric relationship with respect to crank support boss 36. Cam 38 traverses approximately 120 degrees in arcuate extent and has a low height at its beginning 40 and a maximum height at its end 42. The cam 38 is also positioned so that it coincides over the greater part of its length with window 30 of top mounting plate 14.

The crank mechanism 26 comprises three arms 44 which are cantilevered from a common connection point which overlies and rests upon the top surface of crank support boss 36. A spacer 46 is positioned at the center of crank mechanism 26 to help support it in a suspended position between mounting plates 14 and 18. The central stabilization provided by spacer 46 also becomes a pivot point about which crank mechanism 26 can rotate.

Since each one of the three arms 44 of crank mechanism 26 are identical, only one of them need be described in detail. Positioned intermediate the center of rotation or spacer 46 and handle 28 is a lug support 48. The lug support 48 is positioned on what can be considered the trailing edge 50 of arm 44. Lug 34 is pivotly connected to lug support 48.

During the rotation of crank mechanism 26, which is shown by arrow 32, the pivoted lug 34 is in a down attitude as it approaches the beginning end 40 of cam 38. As crank mechanism 26 continues to rotate in the direction of arrow 32, the lug begins to pivot so that its upstanding leg 51 begins to rise since the lug 34 is being influenced by cam 38. Cam 38 is positioned such that it causes lug 34 and attached upstanding leg 52 to clear the edge of window 30 in top mounting plate 14 yet raise upstanding leg 52 high enough to engage firmly the interior rim area of the bottom closure of the closure stack contained in closure housing 12. The continued rotation of crank mechanism 26 further raises upstanding leg 52, thus assuring that the closure being extracted through closure exit slot 16 is not damaged.

When lug 34 reaches the cam end 42, it once again pivots about its hinged point and drops to a position against bottom mounting plate 18. While not shown, a spring assist can be utilized to make certain lug 34 disengages itself with the rim of the closure when lug 34 rotates past the end 42 of cam 38. Thus the closure that has just been extracted is freed from engagement with the upstanding leg 52 of lug 34. The closure can then be moved manually across the top surface of top mounting plate 14 without any interference from lug 34 and on to a nearby held container. This is not only a rapid way to extract closures from a stack, but also assures that the interior of the closure is not handled by the operator.

Figure 3:
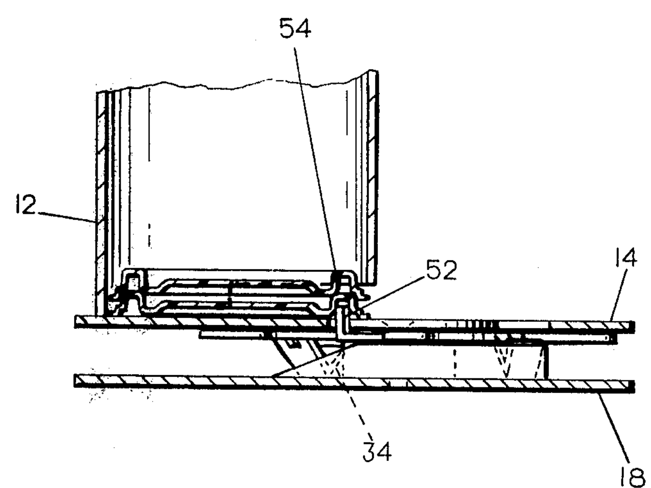
FIG. 3 is an elevational side view, part in section and taken along lines 3—3 of FIG. 1, which shows closures stacked within the device.

Referring to FIG. 3, there is shown a side elevational view part in section and taken along lines 3—3 of FIG. 1. Several closures 54 are shown in stacked array within closure housing 12. The closures have built-in stacking features which keep the rim of each closure from resting upon the rim of the most immediately adjacent closure. The upstanding leg 52 of lug 34 is shown in an upwardly cammed position beneath the rim of the bottommost closure within closure housing 12. As the operator rotates handle 28, closure 54 will begin to move through closure exit slot 16, and as it does so, it will raise slightly the closures stacked above it. The closure 54 will move out of closure housing 12 and to a position where it can be moved to a position on a container.

The present invention provides a quick and easy way of dispensing closures by the use of one hand while holding a filled container in the other hand.

What is claimed is:

1. A dispenser for closures including an elongate hollow structure for storing a stacked array of closures, a first plate attached to one end of said elongate hollow structure, an aperture positioned between said structure and said first plate for the removal of closures from said structure, a second plate mounted in spaced apart relationship and parallel to said first plate, a crank mechanism positioned between said first and second plates, articulated members attached to said crank mechanism, a cam block for moving said articulated members one at a time into engagement with a closure whereby said closure is translated from said stacked array to a position outside of said hollow structure.

2. A dispenser for rim containing closures including a tubular structure for storing a stack of nested closures, a first plate attached to one end of said tubular structure, an aperture positioned circumferentially around part of the tubular structure at the juncture between said structure and said first plate, a lug opening positioned in said first plate, said opening partially underlying said tubular structure, a second plate mounted in spaced apart relationship and parallel with respect to said first plate, a crank mechanism containing a plurality of arms cantilevered from a central hub, said crank mechanism pivoted for arcuate movement, an articulated lug attached intermediate the ends of said arms, cam means attached to said second plate and positioned in an arcuate path around at least part of said central hub, said lugs coacting with said cam surface so that the lugs extend one at a time through the lug opening in said first plate and engage the rim of a closure whereby said closure is translated from said stack of nested closures to a position outside of said tubular structure.

3. A dispenser for rim containing closures including a cylindrical vertically oriented hollow structure for storing a stack of nested closures, a first plate attached to one end of said cylindrical structure, an aperture positioned circumferentially around at least one half the arcuate extent of said cylindrical structure and positioned at the juncture between said structure and said first plate, a lug opening positioned in said first plate, said opening partially underlying said cylindrical structure, a second plate mounted in spaced apart parallel relationship with respect to said first plate by spacer means, a crank mechanism containing a plurality of arms spaced an equal arcuate distance from one another and cantilevered from a central hub, said crank mechanism provided about its center for arcuate movement about said hub, an articulated lug attached intermediate the ends of said arms, cam means positioned so as to coincide with at least a part of said lug opening in said first plate, said cam means attached to said second plate and positioned in an arcuate path around at least part of said central hub, said lugs coacting with said cam surface so that the lugs extend one at a time through the lug opening in said first plate and engage the rim of a closure whereby said closure is translated from said stack of nested closures to a position outside of said cylindrical structure.

4. A dispenser as claimed in claim 3 wherein said crank mechanism contains three cantilevered arms.

5. A dispenser as claimed in claim 3 wherein the ends of each of said arms is a handle for applying a rotary force to said crank mechanism.

6. A dispenser as claimed in claim 3 wherein said cam means is circular in extent.

7. A dispenser as claimed in claim 3 wherein the cam means is positioned so as to cause said lug to move below the surface of said first plate before it has reached the arcuate extent of the lug opening in said first plate.

8. A dispenser as claimed in claim 3 wherein said crank mechanism is spaced apart from both said plates.

* * * * *